(12) United States Patent
Janugani et al.

(10) Patent No.: US 11,438,669 B2
(45) Date of Patent: Sep. 6, 2022

(54) METHODS AND SYSTEMS FOR SIGN LANGUAGE INTERPRETATION OF MEDIA STREAM DATA

(71) Applicant: DISH NETWORK L.L.C., Englewood, CO (US)

(72) Inventors: Swapna Janugani, Englewood, CO (US); Joshua Englebert, Elizabeth, CO (US)

(73) Assignee: DISH Network L.L.C., Englewood, CO (US)

( * ) Notice: Subject to any disclaimer, the term of this patent is extended or adjusted under 35 U.S.C. 154(b) by 110 days.

(21) Appl. No.: 16/694,999

(22) Filed: Nov. 25, 2019

(65) Prior Publication Data

US 2021/0160580 A1     May 27, 2021

(51) Int. Cl.
*H04N 21/44*     (2011.01)
*G10L 15/22*     (2006.01)
(Continued)

(52) U.S. Cl.
CPC ......... *H04N 21/4882* (2013.01); *G10L 15/22* (2013.01); *G10L 15/26* (2013.01);
(Continued)

(58) Field of Classification Search
CPC ......... G10L 15/22; G10L 15/26; G10L 21/10; G10L 21/18
(Continued)

(56) References Cited

U.S. PATENT DOCUMENTS

2002/0140718 A1 * 10/2002 Yan .................. G10L 21/06
                                                                    715/706
2002/0143531 A1 * 10/2002 Kahn ................ G10L 15/26
                                                                    704/235
(Continued)

FOREIGN PATENT DOCUMENTS

JP         2011175598 A   *   9/2011

OTHER PUBLICATIONS

Ozer, Jan "Closed Captioin for Streaming Media", streamingmedia. com, Streaming Media Magazine, posted on Nov. 16, 2012, all pages (Year: 2012).*

(Continued)

*Primary Examiner* — Nathan J Flynn
*Assistant Examiner* — Caroline Somera
(74) *Attorney, Agent, or Firm* — Perkins Coie LLP

(57) ABSTRACT

Techniques are described by which set-top boxes receive closed-captioning data streams as input to a Sign Language Interpretation (SLI) library. Depending on the demographics, different SLIs are provided. Additionally, input audio stems, e.g., for video programs without closed captioning, are sent to a speech-to-text processor before the SLI library. The text stream is then converted into sign language view mode in a PIP window for single view mode or to a multiview window for dual view mode. The current accessibility setup menu holds the 'SLI' option on/off button. SLI library contains videos for vocabulary which are sequenced in the SLI mode view window based on input text from closed captioning stream. If there is a word without a matching video in the SLI library, then the word itself is displayed in the SLI window. Such words are reported to a server for possible future package release with the additions.

19 Claims, 9 Drawing Sheets

(51) Int. Cl.
*G10L 21/10* (2013.01)
*G10L 21/18* (2013.01)
*G10L 15/26* (2006.01)
*H04N 21/488* (2011.01)
*H04N 21/439* (2011.01)
*H04N 21/422* (2011.01)
*H04N 21/43* (2011.01)

(52) U.S. Cl.
CPC .............. *G10L 21/10* (2013.01); *G10L 21/18* (2013.01); *H04N 21/42203* (2013.01); *H04N 21/4302* (2013.01); *H04N 21/4392* (2013.01); *H04N 21/4394* (2013.01); *H04N 21/44* (2013.01)

(58) Field of Classification Search
USPC ........................................................ 725/139
See application file for complete search history.

(56) References Cited

U.S. PATENT DOCUMENTS

| | | | | |
|---|---|---|---|---|
| 2009/0012788 | A1* | 1/2009 | Gilbert | G10L 21/06 704/235 |
| 2010/0027765 | A1* | 2/2010 | Schultz | H04M 3/42391 379/52 |
| 2011/0283865 | A1* | 11/2011 | Collins | G06F 3/04817 84/464 R |
| 2014/0046661 | A1* | 2/2014 | Bruner | G06F 40/56 704/235 |
| 2014/0324428 | A1* | 10/2014 | Farraro | G10L 15/22 704/244 |
| 2016/0098395 | A1* | 4/2016 | DuBose | G10L 15/26 704/2 |
| 2018/0365940 | A1* | 12/2018 | Menard | G09B 9/00 |
| 2020/0007947 | A1* | 1/2020 | NarayanaMurthy | H04N 21/84 |
| 2020/0294525 | A1* | 9/2020 | Santos | G10L 15/22 |
| 2021/0344941 | A1* | 11/2021 | Radford | H04N 19/46 |

OTHER PUBLICATIONS

Zee, Samantha, "Whose Sign is It Anyway? AI Translates Sign Language into Text", Nvidia, May 11, 2017, all pages (Year: 2017).*

Oh, et al., "Avatar Based Sign Language Interpretations for Weather Forecast and Other TV Programs", IBC, Mar. 24, 2017 (Year: 2017).*

The American Sign Language Avatar Project at Depaul University, <http://asl.cs.depaul.edu/>, printed Jan. 25, 2019 (Year: 2019).*

"Celebrity Deaf Advocate Nyle DiMarco Teams Up With Lionsgate and Actiview to Bring American Sign Language to Films," transcript, Feb. 26, 2019, URL: <https://cheddar.com/media/celebrity-deaf-advocate-nyle-dimarco-teams-up-with-lionsgate-and-actiview-to-bring-american-sign-language-to-films>.

* cited by examiner

US 11,438,669 B2

METHODS AND SYSTEMS FOR SIGN LANGUAGE INTERPRETATION OF MEDIA STREAM DATA

BACKGROUND

Presently, most television programs and similar media do not have live sign language interpretation making it difficult for the hearing impaired to watch and understand. Although currently there is an option for closed captioning, not all viewers, e.g., young hearing disabled children, can read or may find reading challenging. For example, some readers may have a reading disorder, such as dyslexia. Thus, presently millions of deaf users who are using sign language as their primary mode of communication and also people with some other intellectual and physical disabilities (such as autism, cerebral palsy, down syndrome, brain or speech disorders) are deprived of a more natural viewing experience due to lack of technical innovation.

BRIEF DESCRIPTION OF THE DRAWINGS

The same number represents the same element or same type of element in all drawings.

DETAILED DESCRIPTION

Figure 1:
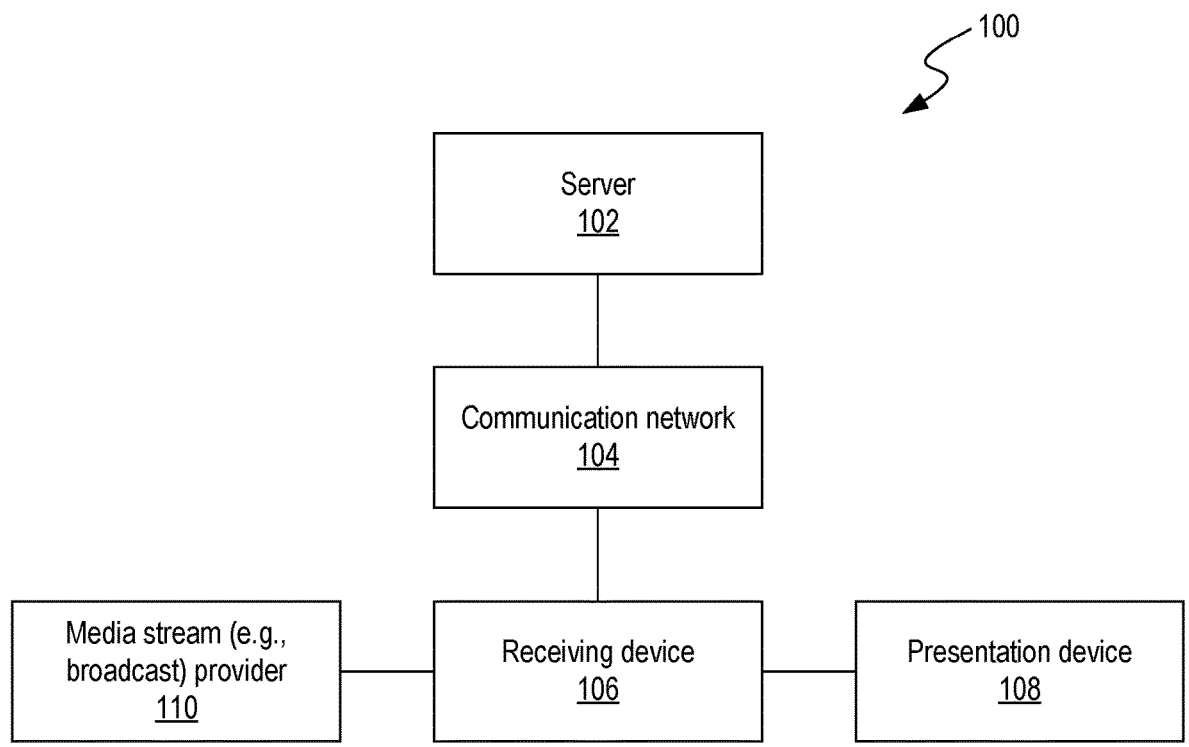
FIG. 1 illustrates an embodiment of a system for using the Sign Language Interpretation (SLI) library, in accordance with various aspects of the present disclosure.

Most television programs and similar media do not have live sign language interpretation making it difficult for the hearing impaired to watch and understand. Although currently there is an option for closed captioning delivered with some media, having a Sign Language Interpretation (SLI) mode could be a more natural viewing experience for the hearing impaired. The SLI could serve millions of deaf users who are using sign language as their primary mode of communication and also people with some other intellectual and physical disabilities (e.g., autism, cerebral palsy, down syndrome, brain or speech disorders). The SLI mode can also help an individual trying to learn sign language. For example, an upgrade package having SLI capabilities may be downloaded as an extended offering.

The various embodiments described herein generally provide apparatus, systems and methods which facilitate the reception, processing, rendering, and outputting of a media stream. More particularly, the various embodiments described herein provide for a SLI mode. The media source may be a broadcast provider or even user-sourced (e.g., from a microphone), capable of capturing a media stream with their own personal capture devices, e.g., mobile devices. In some embodiments, the media stream can include live broadcasting of one or more events.

In at least one embodiment, the media stream to be received, processed, rendered, and displayed may come in any form of media stream. Exemplary media stream formats include Motion Picture Experts Group (MPEG) standards, Flash, Windows Media and the like. It is to be appreciated that the media stream may be supplied by any source, such as an over-the-air broadcast, a satellite, or cable television distribution system, a digital video disk (DVD) or other optical disk, the Internet or other communication networks, and the like. In at least one embodiment, the media stream may be associated with supplemental data that includes text data, such as closed captioning data or subtitles. Portions of the closed captioning data may be associated with specified portions of the media stream.

Generally, a media stream is a contiguous block of associated audio and video data that may be transmitted to, and received, by, an electronic receiving device, such as a terrestrial ("over-the-air") television receiver, a cable television receiver, a satellite television receiver, an Internet connected television or television receiver, a computer, a portable electronic device, or the like. In at least one embodiment, a media stream includes an event. The event may be a contiguous block of programming from a television channel (e.g., an episode of a television show or a football game) or other identifiable media content.

Further, a media stream may be delivered by any transmission method, such as broadcast, multicast, simulcast, closed circuit, pay-per-view, on-demand, over-the-top (by "streaming," file transfer, or other means), or other methods. Additionally, the media stream may be transmitted by way of any communication technology, such as by satellite, wire or optical cable, wireless, or other means. The media stream may also be transferred over any type of communication network, such as the Internet or other wide area network, a local area network, a private network, a mobile communication system, a terrestrial television network, a cable television network, and a satellite television network.

FIG. 1 illustrates an embodiment of a system 100 for adding sign language interpretation of media stream data, in accordance with various aspects of the present disclosure. The system 100 includes a server 102 (e.g., a cloud server), a communication network 104, a receiving device 106 which communicates with the server 102 over the communication network 104, a media stream provider 110 (e.g., a broadcast provider or other sources as discussed above) and a presentation device 108 (e.g., a display and speakers). The receiving device 106 is communicably connected to the media stream provider 110 and to the presentation device 108.

The communication network 104 may be any network capable of communicating instructions and data to and from the server 102. Exemplary communication networks include the Internet, cellular networks, WiFi networks, local area networks (LAN), and the like. The communication network 104 may utilize any desired combination of wired (e.g., cable and fiber) and/or wireless (e.g., cellular, satellite, microwave, and radio frequency) communication mediums and any desired network topology (or topologies when multiple mediums are utilized).

The broadcast provider 110 provides broadcast streams to the receiving device 106. In some embodiments, the broadcast provider 110 may provide the broadcast stream over a video distribution network, such as an over-the-air distribution network, a satellite distribution network, a cable distribution network, and/or the internet. Examples of a broadcast provider 110 may include an over-the-air broadcast station, a television network, a cable television provider, a satellite television provider, an on-demand media streaming service, a pay-per-view media streaming service, and/or an over-the-top media streaming service (e.g., internet video streaming).

The receiving device 106 may be any device capable of receiving a media stream and rendering the media stream. For example, the receiving device 106 may be a set-top box (STB) configured to communicate with a cable or satellite distribution network. In another example, the receiving device 106 may be computer, a mobile phone, a tablet, or similar device configured to communicate with the internee or comparable data communication network. In an embodiment, the media stream received by the receiving device 106 includes at least audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations. The receiving device 106 renders the received media stream and provides the audio/video rendering to the presentation device 108 for display to a user.

The presentation device 108 may be any device configured to receive an audio/video rendering from the receiving device 106 and present the audio/video rendering to a user, Examples of the presentation device 108 include a television, a video monitor, a smartphone, a desktop, a laptop, a tablet PC, or similar device capable of presenting audio and video information to a user. The receiving device 106 may be communicatively coupled to the presentation device 104 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 108 may be integrated with the receiving device 106. For example, each of a computer, a mobile phone, a tablet, or other communication devices may serve as both the receiving device 106 and the presentation device 108 by providing the capability of receiving media streams, and presenting the received media streams to a user. In another implementation, a cable-ready television may include a converter device for receiving media streams, and displaying the media streams to a user.

Figure 2A:
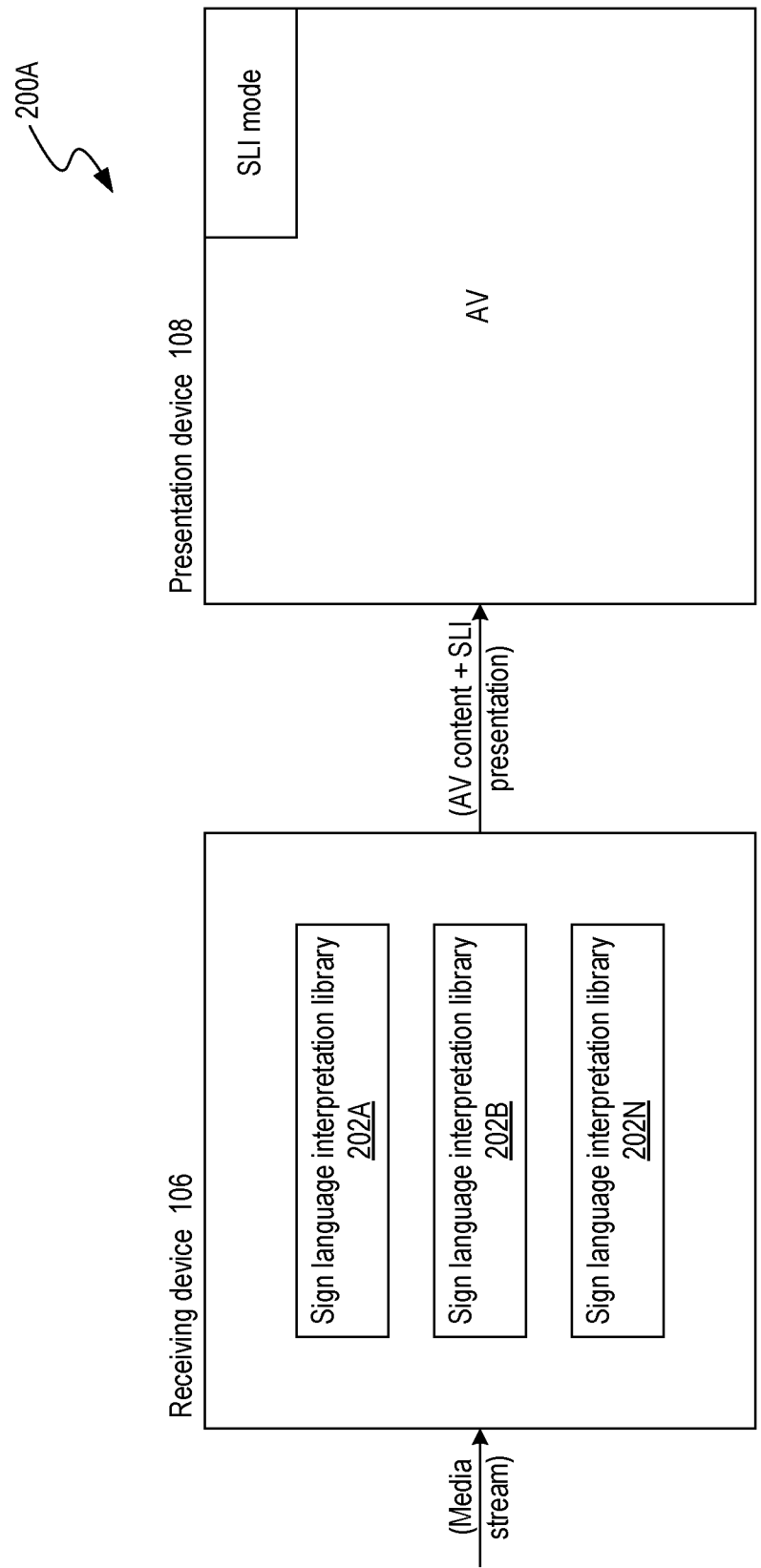
FIG. 2A illustrates an example of a high level flow diagram of receiving a media stream and presenting the SLI mode along with the rendered audio-visual (AV) content, in accordance with various aspects of the present disclosure.

An embodiment of providing SLI mode can be described with reference to FIG. 2A, a high level flow diagram 200A of a media stream and presenting the SLI mode along with the rendered audio-visual (AV) content. A media stream is received by the receiving device 106. The media stream may originate from the media stream provider 110 discussed herein. The receiving device 106 contains or is associated with at least one sign language interpretation library 202. For example and as shown in FIG. 2A, receiving device 106 contains N sign language interpretation libraries (202A, 202B, ... 202N). It should be appreciated that while FIG. 2A depicts the sign language interpretation libraries as being contained within receiving device 106, the sign language interpretation libraries may reside separately from receiving device 106 and receiving device 106 is configured to communicate with the sign language interpretation libraries 202.

Each sign language interpretation library (e.g., 202A, 202B, 202N' is configured with processing capabilities as well as storage capabilities. For example, sign language interpretation library 202 may contain a processor that is capable of matching a text stream or portion of a text stream with a video stored in a video storage (not shown), also residing in the sign language interpretation library 202. In another embodiment, sign language interpretation library 202 may reside remote to the receiving device 106, yet receiving device 106 is configured to process commands for the sign language interpretation library 202 and to transmit the media stream or portion of the media stream to the sign language 202. Further details about sign language interpretation library 202 are discussed herein with regard to FIG. 4.

In an embodiment, SLI library 202 matches the incoming text stream or portions thereof with sign language video streams, each of which depict portions of language. For example, if a portion of a text stream includes the phrase, thank you, then, in an embodiment, SLI library 202 matches such phrase with a video the depicts the sign language interpretation of the phrase, thank you. For instance, such thank you video may be of an adult woman signing thank you. As another example, the video may be of a young boy may signing thank you. In another embodiment, an animation process is included (not shown) that, upon receipt of a command to generate a thank you sign language interpretation, generates an animated character that signs the phrase, thank you.

Thus, in an embodiment, in response to receiving a text stream, SU library builds a sequence of videos depicting sign language interpretation of the text stream, where the sequence is based on the order of text language in the text stream. That is, in an embodiment, the SLI processor is communicable connected to a SU database that stores a plurality of sign language videos, each video representing a unit of language and creates a sign language presentation using a subset of the sign language videos from the SLI database.

Subsequent to the building of the SLI presentation, the receiving device transmits a combination of the audio-visual (AV) content from the text stream and the sign language presentation for delivery to the presentation device 108. It should be appreciated that the AV content and the SU presentation may be transmitted as a text stream event associated with the text stream is ongoing. That is, the AV content and the SLI presentation may be transmitted as programming from a television channel (e.g., an episode of a television show or a football game) is being viewed by a user. In another implementation, the AV content and the SLI presentation were previously stored in a storage and upon command, e.g., from a user device, are extracted from storage and transmitted to presentation device 108 for viewing.

In an embodiment, the combined audio-visual content and sip language presentation is configured so that the audio-visual content is presented in the main or primary screen area of the presentation device 108 and the sip language presentation is presented simultaneously in a second, smaller screen area of the presentation device 108 as compared to the main screen area. It should be appreciated that the main screen area may be configured to be smaller comparatively to the second screen area, for example by settings chosen by a user via an interface device. As an example, a young person may want the SLI presentation videos to be the main display on the television screen while the actual AV content be shown on a smaller area on the main screen. In an embodiment, the SLI presentation is displayed as a window on top of the broadcast stream from the broadcast provider 110, similar to a picture-in-picture display. The user may then swap Which stream is being overlaid by selecting one of the windows with a user interface device (not shown). The user interface device may be a remote control, a touch screen, a mouse, a keyboard, a motion input device, a pointer, or other device capable of providing commands to the receiving device 106 or to the presentation device 108.

Figure 2B:
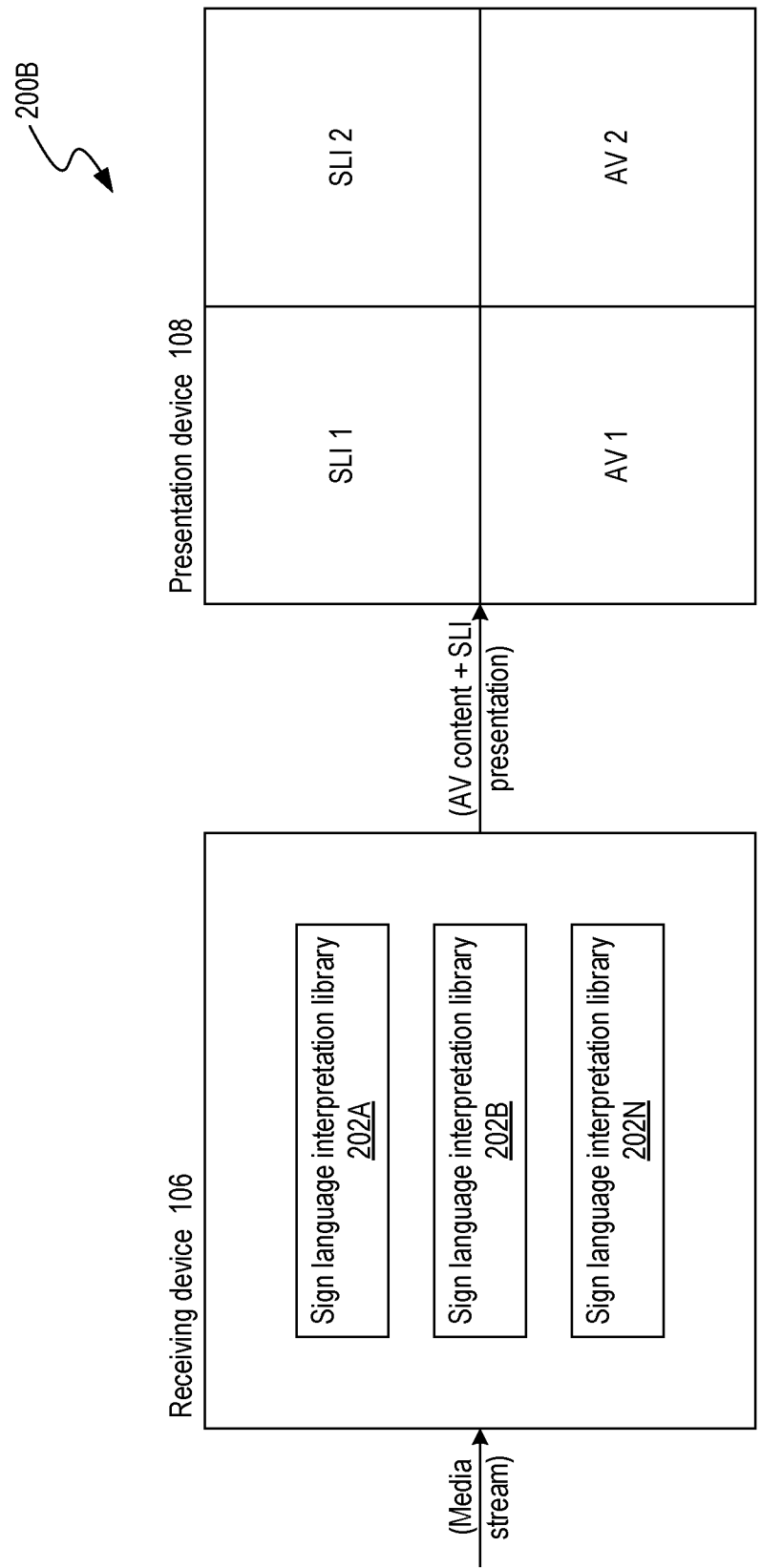
FIG. 2B illustrates an example of a high level flow diagram of receiving a media stream with two different contents and presenting two corresponding SLI modes along with the rendered AV signals, in accordance with various aspects of the present disclosure.

Another embodiment can be described with reference to FIG. 2B, a high level flow diagram 200B of receiving a media stream with two different contents and presenting two corresponding SLI modes along with the rendered AV signals (e.g., in multiview mode). Here, the flow for receiving the media stream by the receiving device is the same as in FIG. 2A. Also, the generation of the SLI presentations to match or otherwise correspond to the AV content of the media stream(s) is similar as in FIG. 2A. However, in an embodiment, the receiving device 106 transmits to the presentation device 108 two or more combinations of AV content and corresponding SLI presentations. In an embodiment, presentation device 108 receives two or more AV content and SLI presentation combinations and is configured to display two or more such combinations at the same time on one display screen, e.g., in multiview mode. In an embodiment, presentation device is configured to visually depict each combination. For example, the first combination (AV 1 and SLI 1) may be presented in two screens, the outside borders of which are drawn in a same color, such as red, for instance. The second combination (AV 2 and SU 2) may be presented in two screens, the outside borders of which are drawn in a same color, such as blue. The types of visual depictions are non-limiting. As another example, each window of each pair may contain an icon, such as a filled-in colored circle or a filled-in colored square which when presented on a window would indicate that that window is part of the combination of the other window displaying the same icon. These examples are for understanding purposes and are not meant to be limiting. Further, it should be appreciated that the depiction of two different contents and thus two different SLI modes is not meant to be limiting. One or more media streams having a plurality of different contents and presenting the plurality of corresponding SLI modes along with the rendered AV signals is contemplated and the number of which may be subject to design.

Figure 3:
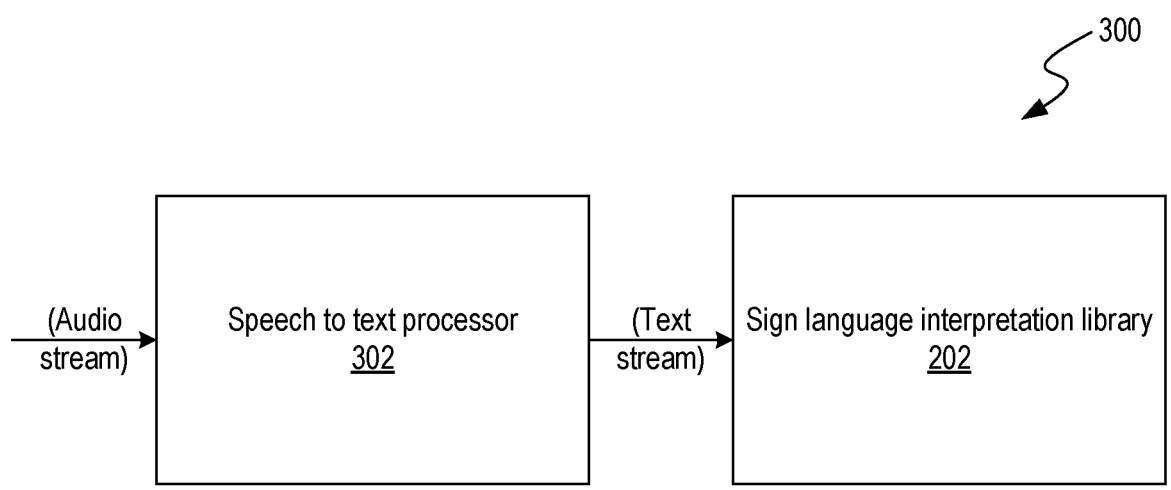
FIG. 3 illustrates a flow diagram of an audio stream being input to a speech-to-text processor and the output text being input to the SLI library, in accordance with various aspects of the present disclosure.

An embodiment can be understood with reference to FIG. 3, a flow diagram 300 of an audio stream being input to a speech-to-text processor and the output text being input to the SLI library. Not all media streams containing signals that represent a media event have closed-captioned text. Also, even if a media stream contains closed-captioned text, it may be defective or there might be a user setting which has closed captioning disabled or not purchased, and so on. Thus, there are times when the audio stream may need to be extracted from the text stream. Also, there may be times when a user chooses obtain sign language interpretation of an audio stream. For instance, in an embodiment, a user may state or record speech aurally via a microphone and desire for the corresponding sign language interpretation to display on the screen of the presentation device 108. Thus, an embodiment includes a speech to text processor 302. In an embodiment, receiving device 106 extracts the audio stream from the input media stream and inputs the audio stream into speech to text processor 302. It should be appreciated that speech to text processor 302 may reside at various places. Speech to text processor 302 may reside within receiving device 106, may reside within SLI library 202, or may reside remotely to receiving device 106 in which case receiving device 106 is communicably connected to Speech to text processor 302. In an embodiment, speech to text processor 302 is an off-the shelf processor and is configured to accept audio stream signals originating from the media stream and configured to output a text stream that is consistent with input for the SLI library 202. As shown, in an embodiment, an audio stream is input into speech to text processor 302, speech to text processor 302 processes the audio stream and produces and outputs the corresponding text stream, and the output text stream is then input into the SLI library 202 for the purpose of obtaining an SLI presentation as output.

Figure 4:
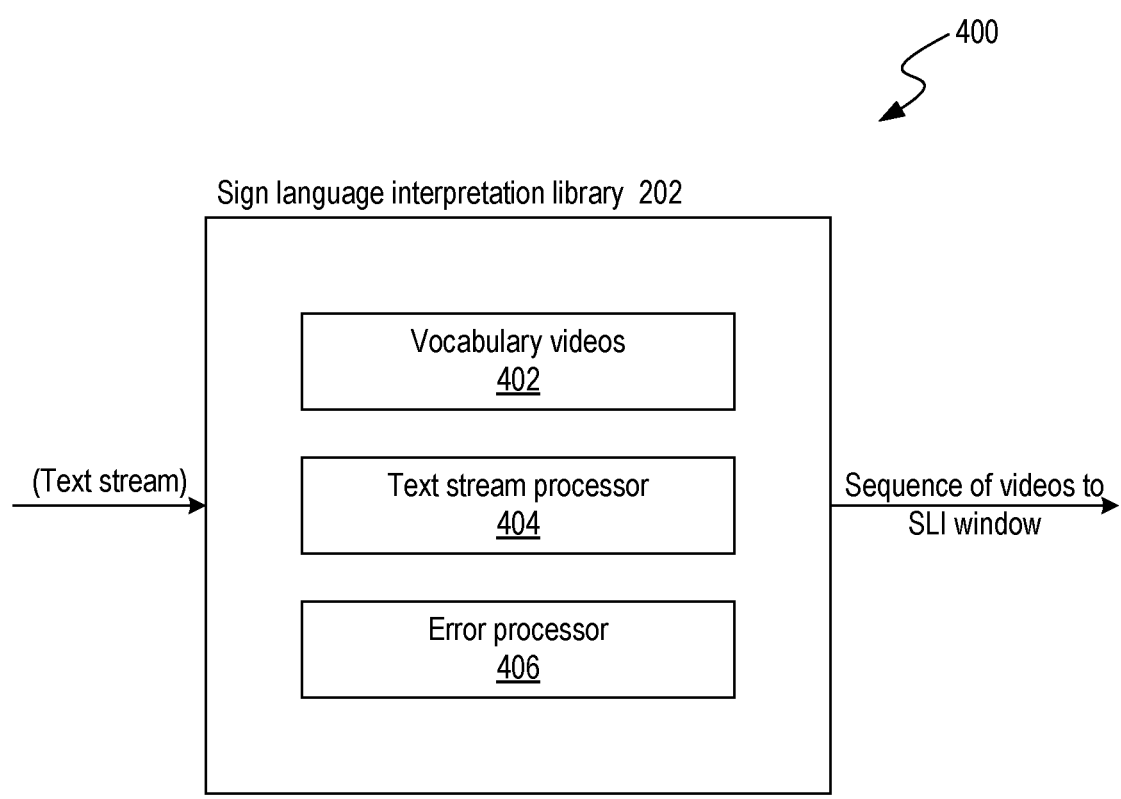
FIG. 4 illustrates a schematic diagram of components of the SLI library, in accordance with various aspects of the present disclosure.

An embodiment can be understood with reference to FIG. 4, a schematic diagram 400 of components of the SLI library. The SLI library 202 is configured to receive text streams and output a sequence of videos (e.g., an SLI presentation) of sign language interpretation to an SLI window (e.g., in presentation device 108), In an embodiment, SLI library 202 includes a text stream processor 404 that acts on the received text stream and creates the sequence of videos (e.g., an SLI presentation) of sign language interpretation. Further, the SLI library 202 includes or contains a repository of vocabulary videos 402. Also, SLI library 202 contains an error processor 406.

The text stream processor 404 is configured to analyze the text stream and determine or parse therefrom individual language units that may correspond to individual videos depicting sign language interpretation of those language units. To repeat the example above, text stream processor 404 may be configured to detect the phrase, thank you, from the input text stream. In an embodiment, text stream processor 404 uses a tag mechanism to match language units with vocabulary videos. Consider, for example a language unit, apple. In accordance with an embodiment, such language unit may be associated with a plurality of tags, such as but not limited to juicy, red, green, fruit, crispy, and so on. The SLI library 202 may use these tags to identify and select an appropriate SLI video for a given language unit. In an embodiment, the type of tags or the prioritization of the tags may improve over time depending on user feedback, machine learning, firmware updates, and the like. In an embodiment, the user may also configure an SLI video with a tag. For instance, support the media stream event represents an instructional video that the user may intend to view again in the future. The user may add a tag to a particular SLI video so that such video is chosen (e.g., matches with) and displayed by the SLI library 202 to correspond to one or more frames of the audio-visual content.

In an embodiment, the SLI library 202 sequences the SLI videos to coincide with the sequence of detected language units as they are presented within the originating media stream. Suppose for example that the media stream represents a movie in which the doorbell rings, the actor verbalizes that the doorbell has rung, and the actor subsequently answers the door and verbalizes the greeting, "Hello!" Suppose further that the corresponding language units are similar to "the doorbell rang" and "Hello!". Then, in accordance embodiments herein, the SLI videos for "the doorbell rang" and "Hello!" will be presented in such order and not in the reverse order where the SLI video for "Hello!" is presented before the SLI video corresponding to "the doorbell rang."

In an embodiment, the vocabulary video repository 402 is prepopulated with videos, each depicting a unit of language such as a phrase or word, for example. In an embodiment, such phrases or words correspond to typical or frequent phrases and words used in sign language. Thus, vocabulary video repository 402 may contain a plurality of videos that correspond to sign language used most by individuals who sign. For instance, vocabulary video repository 402 may contain 95% of most used sign language interpretative words or phrases. Or, in another implementation, vocabulary video repository 402 may contain 80% of most used sign language interpretative words or phrases. It should be appreciated that these percentages are by way of example and are not meant to be exhaustive.

In an embodiment, the SLI library 202 includes a smoothing process that improves the continuous presentation of otherwise disjointed SU videos. The smoothing process minimizes an abrupt transition from a first SLI video to a subsequent second SU in a sequence of SLI videos of the sign language presentation. In one embodiment, each SLI video can be constructed in a standardized way so that the signing (e.g., by a person or whatever entity is signing) begins at a same, beginning spot within the video and ends at a same, ending spot within the video so that the beginning of any SLI video matches the ending of any other SU video. In another embodiment, an animation processor is included and is configured to generate animated sign language interpretation videos in accordance with rules that enforce the smoothness from one SLI video to the subsequent, for example, as previously described. As another example, the animation process may be configured to animate a character to perform the signing in such a way that the next video picks up where the previous video left off. It should be appreciated that other types of smooth processes are contemplated and may be consistent with embodiments herein.

In an embodiment, the SLI library 202 is configured to instruct the presentation device 108 to display lag notifications indicating that the sign language presentation is a specific amount of time behind the playing of the audio-video content. For example, the sign language presentation may be up to two minutes behind the playing of the corresponding audio-video content. It should be appreciated that the time of up to two minutes is by example and is not exhaustive. Lag notifications may include text displayed on the screen that is updated in real time. Such text may be a standard text, e.g., such as a time warning, that may be removed or otherwise turned-off by the viewer. Such text may appear in an overlaying window that also may be closed by the viewer.

In an embodiment, the receiving device 106 or the SLI library 202 may buffer the media stream in a local storage. Then, the text stream and subsequent SLI videos may be derived therefrom live or at a later or subsequent point in time. In an embodiment, the media stream is buffered in real time while the corresponding SLI presentation is being created in real time, however with a time lag. Such time lag may allow for the improvement (e.g., due to extra time) in matching the language unit to the optimal SLI video. In another embodiment, the subsequent SLI videos are created at the discretion of the user. For example, the user may record a television show on their device (e.g., a DVR). Such television show may not have any associated closed-captioned data, Thus, in accordance with embodiments herein, the user may choose to convert the television show to the corresponding SLI presentation in a few hours after the recording, overnight, or the like. In an embodiment, the command to convert a recorded media may be selectable (e.g., by a button on a user device or on a touch screen) or in the user application software or firmware made accessible by the provider of such media. In an embodiment, the user may also select that a smoothing process be applied to the output SLI videos to ensure a smoother translation. In an embodiment, once converted, the SLI presentation may be uploaded to or otherwise made available to the server 102 so that such converted media is made available to others, such as a subscribed community in the cloud server 102, family members via the server 102, and so on.

In an embodiment, the SLI library 202 is configured to store the most recently used word in a cache memory so that it may be retrieves therefrom to provide faster access to such SLI video.

Also, SLI library 202 contains an error processor 406. An error may occur when the video chosen or presented not the correct video, the desired video is not present, or for other reasons that the video is undesirable. In an embodiment, the SLI library 202 is configured to receive user inputs (e.g., via a user interface device) indicating that a particular video is incorrect. For instance, while watching an SLI presentation along with audio-visual content, the user can determine via context that a particular SLI video showing a sign language interpretation is incorrect. For example, the user could be watching a documentary about navy seals and is viewing a scene that includes a navy seal frogman, yet the sign language interpretation video shows the signing of an amphibian frog. While viewing the SLI video that the viewer believes is incorrect, the viewer can select this particular video as a candidate for review. For example, the viewer can make a selection using their user input device, make a touch on a touch screen, or otherwise indicate (e.g., by a signal) that the video is incorrect. Such signal or indication is sent to and received by the SLI library 202, which processes the signal and sends a corresponding message to the server 102 for future corrections. For example, server 102 may receive the message that an SLI video is incorrect for this particular media event, make the correction, and transmit the correction in a future release of an updated version of the SLI library 202. In another embodiment, the SLI library 202 may also make and store the correction of the video. For instance, the SLI library 202 may, via a tagging mechanism, artificial intelligence processing, or machine learning processing, learn that the amphibian frog sign was incorrect and find another (correct) SLI video in the current, downloaded vocabulary videos repository 402 and display the correct SLI video for frogman going forward.

In an embodiment, when an SLI video is not present to correspond to a particular unit of language of the input text stream, the SLI library 202 may report the lack of the particular video to a server (e.g., server 102) for subsequent SLI processor and/or database 202 updates. Also, in an embodiment, when an SLI video is not present to correspond to a particular unit of language of the input text stream, the SLI library 202 may chose and display a default frame or video. For instance, SLI library 202 may chose and then present the word or phrase that corresponds to such language unit. Or, SLI library 202 may chose a default video, such as for example one indicating that an SLI video is currently not available or the like.

Figure 5:
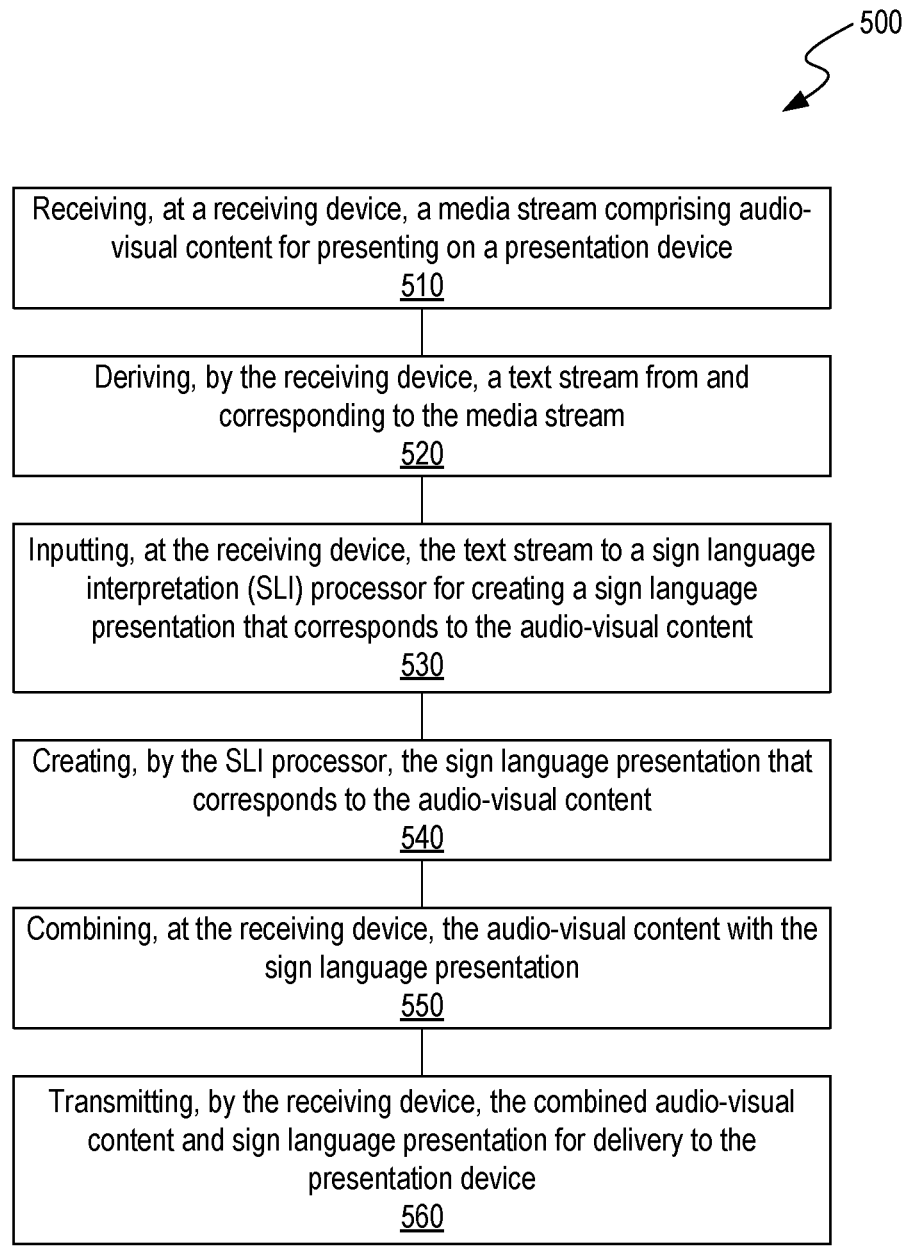
FIG. 5 is a flow diagram showing an example of a method for creating a sign language presentation, in accordance with various aspects of the present disclosure.

An embodiment can be understood with reference to FIG. 5, a flow diagram 500 showing an example of a method for creating a sign language presentation. At step 510, the receiving device (e.g., receiving device 106) receives a media stream comprising audio-visual content for presenting on a presentation device (e.g., presentation device 108). At step 520, the receiving device (e.g., receiving device 106) derives a text stream from and corresponding to the media stream. At step 530, the receiving device (e.g., receiving device 106) inputs the text stream to a sign language interpretation (SLI) processor (e.g., sign language interpretation library 202) for creating a sign language presentation that corresponds to the audio-visual content. At step 540, the SLI processor (e.g., sign language interpretation library 202) creates the sign language presentation that corresponds to the audio-visual content. At step 550, the receiving device (e.g., receiving device 106) combines the audio-visual content with the sign language presentation. At step 560, the receiving device (e.g., receiving device 106) transmits the combined audio-visual content and sign language presentation for delivery to the presentation device.

Figure 6:
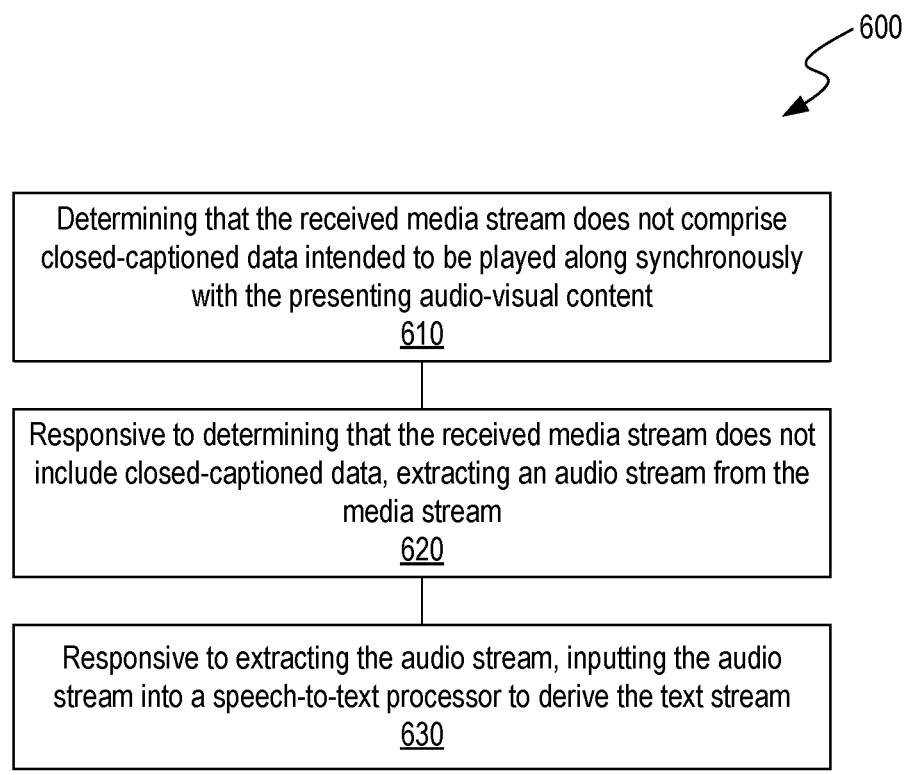
FIG. 6 is a flow diagram showing an example of a method for extracting the audio stream from the media stream having no closed-captioned data, in accordance with various aspects of the present disclosure.

An embodiment can be understood with reference to FIG. 6, a flow diagram 600 showing an example of a method for extracting the audio stream from the media stream having no closed-captioned data. At step 610, the receiving device (e.g., receiving device 106) or the SLI processor (e.g., sign language interpretation library 202) or another processor (not shown) determines that the received media stream does not comprise closed-captioned data intended to be played along synchronously with the presenting audio-visual content. It should be appreciated that the receiving device (e.g., receiving device 106) or the SLI processor (e.g., sign language interpretation library 202) or another processor (not shown) may each be configured to parse the received media stream and make such determination. For instance, the media stream may be parsed and scanned to determine whether a text stream is included in the media stream and whether the text stream may be interpreted as closed-captioned or otherwise corresponding to the audiovisual content. In another embodiment, the media stream may arrive with metadata that indicates whether closed-captioning data or otherwise a text stream associated with the audio-visual content is delivered along with the audio-visual content. At step 620, the receiving device (e.g., receiving device 106) or the SLI processor (e.g., sign language interpretation library 202) or another processor (not shown) extracts an audio stream from the media stream, responsive to determining that the received media stream does not include closed-captioned data. At step 630, the receiving device (e.g., receiving device 106) or the SLI processor (e.g., sign language interpretation library 202) or another processor (not shown) inputs, responsive to extracting the audio stream, the audio stream into a speech-to-text processor to derive the text stream.

Figure 7:
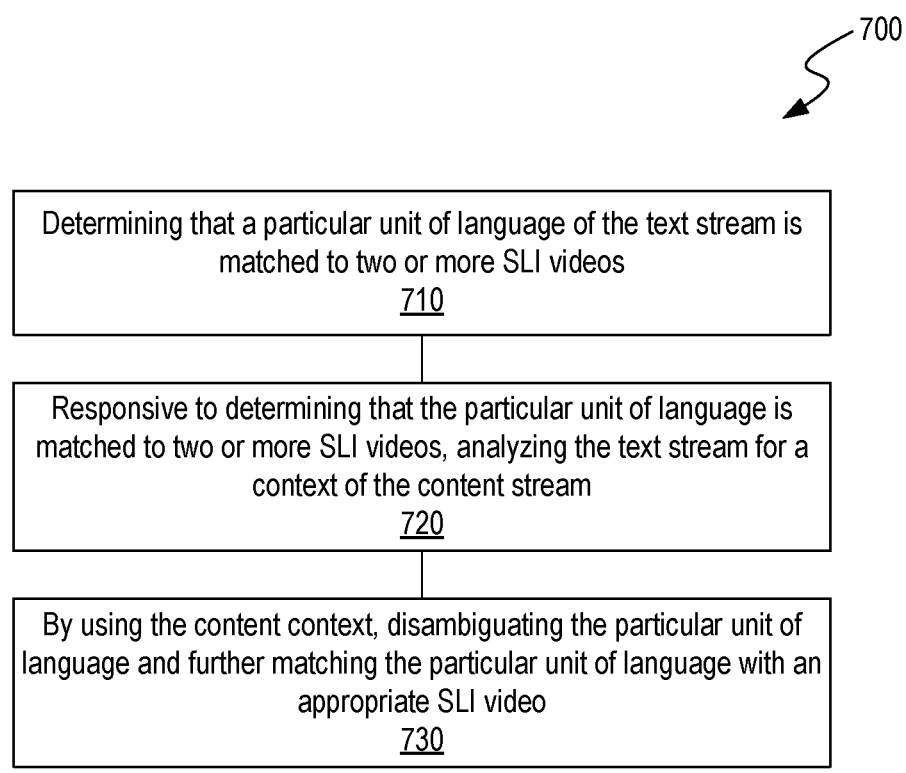
FIG. 7 is a flow diagram showing an example of a method for disambiguating the language and assigning the appropriate SLI videos, in accordance with various aspects of the present disclosure.

An embodiment can be understood with reference to FIG. 7, a flow diagram 700 showing an example of a method for disambiguating the language and assigning the appropriate SLI videos. At step 710, the SLI processor (e.g., sign language interpretation library 202) determines that a particular unit of language of the text stream is matched to two or more SLI videos. At step 720, responsive to determining that the particular unit of language is matched to two or more SLI videos, the SLI processor sign language interpretation library 202) analyzes the text stream for a context of the content. At step 730, the SLI processor (e.g., sign language interpretation library 202), by using the content context, disambiguates the particular unit of language and further matches the particular unit of language with an appropriate SLI video.

In another exemplary embodiment, a method for sign language interpretation of media stream data is disclosed. The method includes receiving, at a receiving device, a media stream comprising audio-visual content for presenting on a presentation device; deriving, by the receiving device, a text stream from and corresponding to the media stream; inputting, at the receiving device, the text stream to a sign language interpretation (SLI) processor for creating a sign language presentation that corresponds to the audio-visual content; creating, by the SLI processor, the sign language presentation that corresponds to the audio-visual content; combining, at the receiving device, the audio-visual content with the sign language presentation; and transmitting, by the receiving device, the combined audio-visual content and sign language presentation for delivery to the presentation device, wherein the combined audio-visual content and sign language presentation is configured so that the audio-visual content is presented in a first screen area of the presentation device and the sign language presentation is presented simultaneously in a second screen area of the presentation device.

Additionally to the method, the receiving device is a set-top-box and the media stream is received from a broadcast provider.

Additionally to the method, deriving further comprises determining that the received media stream comprises closed-captioned data intended to be played along synchronously with the presenting audio-visual content.

Additionally to the method, deriving further comprises: determining that the received media stream does not comprise closed-captioned data intended to be played along synchronously with the presenting audio-visual content; responsive to determining that the received media stream does not comprise closed-captioned data, extracting an audio stream from the media stream; and responsive to extracting the audio stream, inputting the audio stream into a speech-to-text processor to derive the text stream.

Additionally to the method, the combined audio-visual (AV) content and sign language interpretation (SLI) presentation is further configured to play simultaneously with one or more additional combined AV content and SLI presentations, such that each of the AV content is presented in a separate, respective screen area of the presentation device and each of the SLI presentations is presented in a separate, respective screen area of the presentation device, and such that each combined AV content and SLI presentation has a respective visual indicator that forms the combination, thereby resulting in a multiview mode of AV content and corresponding SLI presentations.

Additionally the method further comprises responsive to deriving the text stream, determining a language of the text stream; and responsive to determining the language of the text stream, determining, among two or more SLI processors, an appropriate SLI processor that is configured to create the sign language presentation that corresponds to the determined language; wherein inputting the text stream, by the receiving device, further comprises inputting the text stream to the appropriate SLI processor.

Additionally to the method, the SLI processor was previously downloaded onto a hard drive of the receiving device and wherein updates to the SLI processor are downloaded onto the hard drive on an ongoing basis.

Additionally to the method, the sign language presentation is configured to be displayed in a picture-in-picture (PIP) window.

Additionally to the method, the SLI processor is communicable connected to a SLI database that stores a plurality of sign language videos, each video representing a unit of language and wherein creating the sign language presentation further comprises using a subset of sign language videos from the SLI database.

Additionally to the method, using the subset of sign language videos further comprises sequencing each of the videos to be synchronous with a corresponding unit of language in the audio-visual content.

Additionally to the method, creating the sign language presentation further comprises: determining that the SLI database lacks a particular video to correspond to a particular unit of language of the input text stream; and reporting the lack of the particular video to a server for subsequent SLI processor and/or database updates.

Additionally to the method, the SLI database comprises videos corresponding to more than one type of standard sign language.

Additionally to the method, the sign language presentation further comprises: determining that a particular unit of language of the text stream is matched to two or more SLI videos; responsive to determining that the particular unit of language is matched to two or more SLI videos, analyzing the text stream for a context of the content; and by using the content context, disambiguating the particular unit of language and further matching the particular unit of language with an appropriate SLI video.

Additionally to the method, creating the sign language presentation further comprises applying a smoothing process to minimize an abrupt transition from a first SLI video to a subsequent second. SLI in a sequence of SLI videos of the sign language presentation.

Additionally, the method further comprises: responsive to receiving the media stream, buffering the media stream in a local storage and wherein deriving the text stream from and corresponding to the media stream further comprises using the media stream stored in the buffer.

Additionally to the method, the sign language presentation is further configured to provide a user-interface indicator that is configured to allow a user to interactively indicate that a specific video of a unit of language is incorrect and further configured to transmit a signal to a server when the user-interface indicator is activated.

Additionally to the method, the received media stream comprises only audio and wherein the audio is received from a microphone that is communicably connected to the receiving device.

Additionally to the method, the sign language presentation is further configured to display lag notifications indicating that the sign language presentation is a specific amount of time behind the playing of the audio-video content.

Additionally, an exemplary apparatus that comprises a processor and a non-transitory memory with instructions thereon, wherein the instructions upon execution by the processor cause the processor to perform the method and various embodiments above is disclosed.

Additionally, an exemplary non-transitory computer-readable medium having data stored therein representing software executable by a computer, the software comprising instructions for providing sign language interpretation of audio-visual content in accordance with the exemplary method and various embodiments described above is disclosed.

Figure 8:
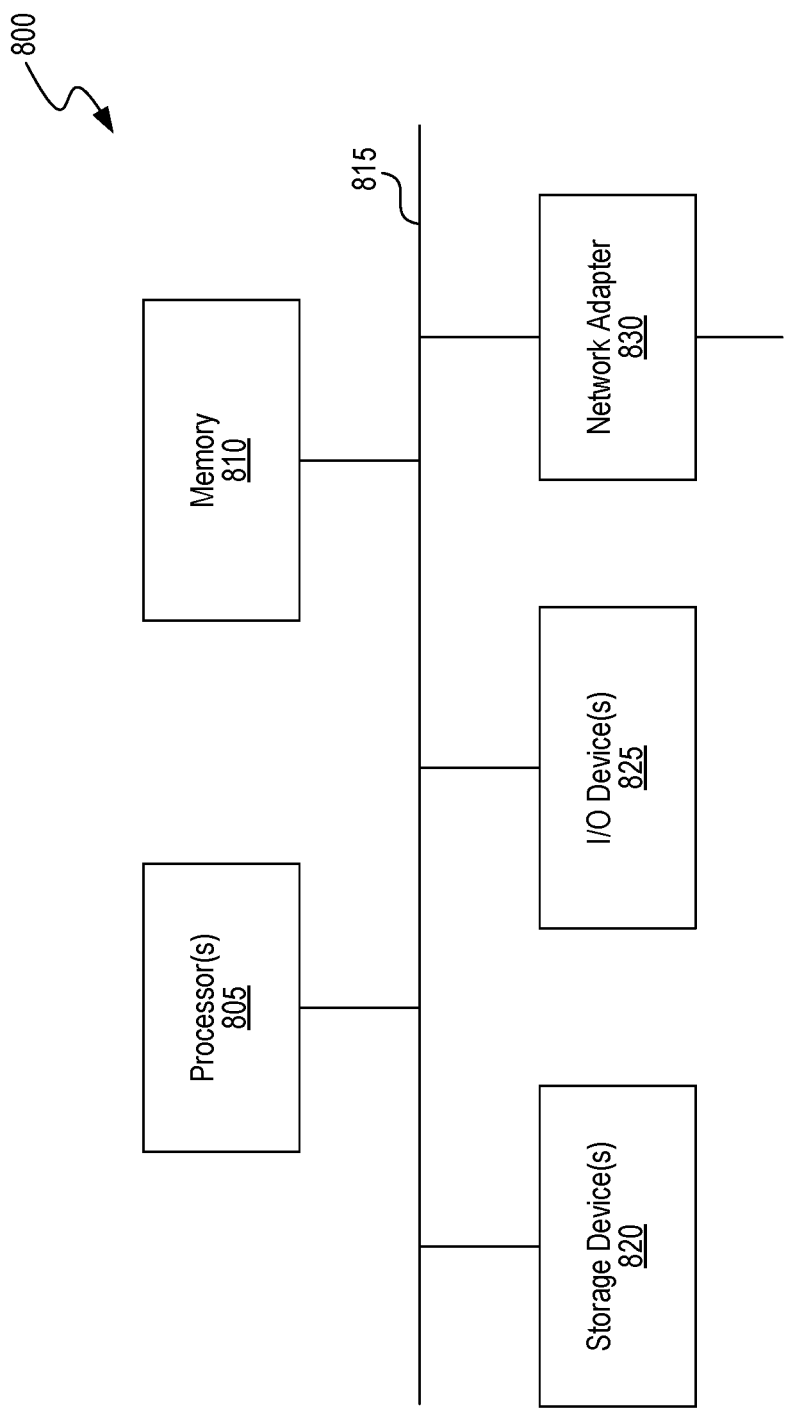
FIG. 8 is a block diagram of a processing system that can implement operations, consistent with various embodiments.

FIG. 8 is a block diagram of a computer system as may be used to implement features of the disclosed embodiments. The computing system 800 may be used to implement any of the entities, components, modules, systems, or services depicted in the examples of the foregoing figures (and any other entities described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component interconnect (PCI) bus or PCI-Express bus, a HyperTransport or industry standard architecture (ISA) bus, a small computer system interface (SCSI) bus, a universal serial bus (USB), IIC (I2C) bus, or an institute of Electrical and Electronics Engineers (IEEE) standard 1394 bus, also called "Firewire".

The memory 810 and storage devices 820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

When logic is implemented as software and stored in memory, logic or information can be stored on any non-transitory computer-readable medium for use by or in connection with any processor-related system or method. In the context of this disclosure, a memory is a non-transitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system (e.g., the control logic 412), apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    receiving, at a receiving device, a media stream comprising audio-visual content for presenting on a presentation device;
    deriving, by the receiving device, a text stream from and corresponding to the media stream, wherein deriving further comprises:
        determining that the received media stream does not comprise closed-captioned data intended to be played along synchronously with the presenting audio-visual content;
        responsive to determining that the received media stream does not comprise closed-captioned data, extracting an audio stream from the media stream; and
        responsive to extracting the audio stream, inputting the audio stream into a speech-to-text processor to derive the text stream;
    inputting, at the receiving device, the text stream to a sign language interpretation (SLI) processor for creating a sign language presentation that corresponds to the audio-visual content;
    creating, by the SLI processor, the sign language presentation that corresponds to the audio-visual content;
    combining, at the receiving device, the audio-visual content with the sign language presentation; and
    transmitting, by the receiving device, the combined audio-visual content and sign language presentation for delivery to the presentation device, wherein the combined audio-visual content and sign language presentation is configured so that the audio-visual content is presented in a first screen area of the presentation device and the sign language presentation is presented simultaneously in a second screen area of the presentation device.

2. The method of claim 1, wherein the receiving device is a set-top-box and the media stream is received from a broadcast provider.

3. The method of claim 1, wherein deriving further comprises:
    determining that the received media stream comprises closed-captioned data intended to be played along synchronously with the presenting audio-visual content.

4. The method of claim 1, wherein the combined audio-visual (AV) content and sign language interpretation (SLI) presentation is further configured to play simultaneously with one or more additional combined AV content and SLI presentations, such that each of the AV content is presented in a separate, respective screen area of the presentation device and each of the SLI presentations is presented in a separate, respective screen area of the presentation device, and such that each combined AV content and SLI presentation has a respective visual indicator that forms the combination, thereby resulting in a multiview mode of AV content and corresponding SLI presentations.

5. The method of claim 1, further comprising:
    responsive to deriving the text stream, determining a language of the text stream; and
    responsive to determining the language of the text stream, determining, among two or more SLI processors, an appropriate SLI processor that is configured to create the sign language presentation that corresponds to the determined language;
    wherein inputting the text stream, by the receiving device, further comprises inputting the text stream to the appropriate SLI processor.

6. The method of claim 1, wherein the SLI processor was previously downloaded onto a hard drive of the receiving device and wherein updates to the SLI processor are downloaded onto the hard drive on an ongoing basis.

7. The method of claim 1, wherein the sign language presentation is configured to be displayed in a picture-in-picture (PIP) window.

8. The method of claim 1, wherein the SLI processor is communicably connected to a SLI database that stores a plurality of sign language videos, each video representing a unit of language and wherein creating the sign language presentation further comprises using a subset of sign language videos from the SLI database.

9. The method of claim 8, wherein using the subset of sign language videos further comprises sequencing each of the videos to be synchronous with a corresponding unit of language in the audio-visual content.

10. The method of claim 8, wherein creating the sign language presentation further comprises:
    determining that the SLI database lacks a particular video to correspond to a particular unit of language of the input text stream; and
    reporting the lack of the particular video to a server for subsequent SLI processor and/or database updates.

11. The method of claim 8, wherein the SLI database comprises videos corresponding to more than one type of standard sign language.

12. The method of claim 1, wherein creating the sign language presentation further comprises:

determining that a particular unit of language of the text stream is matched to two or more SLI videos;
responsive to determining that the particular unit of language is matched to two or more SLI videos, analyzing the text stream for a context of the content; and
by using the content context, disambiguating the particular unit of language and further matching the particular unit of language with an appropriate SLI video.

13. The method of claim 1, wherein creating the sign language presentation further comprises applying a smoothing process to minimize an abrupt transition from a first SLI video to a subsequent second SLI in a sequence of SLI videos of the sign language presentation.

14. The method of claim 1, further comprising:
responsive to receiving the media stream, buffering the media stream in a local storage and wherein deriving the text stream from and corresponding to the media stream further comprises using the media stream stored in the buffer.

15. The method of claim 1, wherein the sign language presentation is further configured to provide a user-interface indicator that is configured to allow a user to interactively indicate that a specific video of a unit of language is incorrect and further configured to transmit a signal to a server when the user-interface indicator is activated.

16. The method of claim 1, wherein the received media stream comprises only audio and wherein the audio is received from a microphone that is communicably connected to the receiving device.

17. The method of claim 1, wherein the sign language presentation is further configured to display lag notifications indicating that the sign language presentation is a specific amount of time behind the playing of the audio-video content.

18. An apparatus for providing sign language interpretation of audio-visual content, comprising:
a processor; and
a non-transitory memory with instructions thereon, wherein the instructions upon execution by the processor cause the processor to:
receive, at a receiving device, a media stream comprising audio-visual content for presenting on a presentation device;
derive, by the receiving device, a text stream from and corresponding to the media stream, wherein to derive further comprises:
to determine that the received media stream does not comprise closed-captioned data intended to be played along synchronously with the presenting audio-visual content;
responsive to determine that the received media stream does not comprise closed-captioned data, to extract an audio stream from the media stream; and
responsive to extract the audio stream, to input the audio stream into a speech-to-text processor to derive the text stream;
input, at the receiving device, the text stream to a sign language interpretation (SLI) processor for creating a sign language presentation that corresponds to the audio-visual content;
create, by the SLI processor, the sign language presentation that corresponds to the audio-visual content;
combine, at the receiving device, the audio-visual content with the sign language presentation; and
transmit, by the receiving device, the combined audio-visual content and sign language presentation for delivery to the presentation device, wherein the combined audio-visual content and sign language presentation is configured so that the audio-visual content is presented in a first screen area of the presentation device and the sign language presentation is presented simultaneously in a second screen area of the presentation device.

19. A non-transitory computer-readable medium having data stored therein representing software executable by a computer, the software comprising instructions for providing sign language interpretation of audio-visual content, the non-transitory computer-readable medium comprising:
instructions for receiving, at a receiving device, a media stream comprising audio-visual content for presenting on a presentation device;
instructions for deriving, by the receiving device, a text stream from and corresponding to the media stream, wherein the instructions for deriving further comprise instructions for:
determining that the received media stream does not comprise closed-captioned data intended to be played along synchronously with the presenting audio-visual content;
responsive to determining that the received media stream does not comprise closed-captioned data, extracting an audio stream from the media stream; and
responsive to extracting the audio stream, inputting the audio stream into a speech-to-text processor to derive the text stream;
instructions for inputting, at the receiving device, the text stream to a sign language interpretation (SLI) processor for creating a sign language presentation that corresponds to the audio-visual content;
instructions for creating, by the SLI processor, the sign language presentation that corresponds to the audio-visual content;
instructions for combining, at the receiving device, the audio-visual content with the sign language presentation; and
instructions for transmitting, by the receiving device, the combined audio-visual content and sign language presentation for delivery to the presentation device, wherein the combined audio-visual content and sign language presentation is configured so that the audio-visual content is presented in a first screen area of the presentation device and the sign language presentation is presented simultaneously in a second screen area of the presentation device.

* * * * *